T. P. ALLEN.
RECEIPT FILE.
APPLICATION FILED APR. 19, 1909.

945,434.

Patented Jan. 4, 1910.

Witnesses
J. H. Crawford
John A. Donegan

Inventor
Theodore P. Allen,
By Chandler & Chandler
Attorneys

UNITED STATES PATENT OFFICE.

THEODORE P. ALLEN, OF HUMPHREYS, MISSOURI.

RECEIPT-FILE.

945,434.  Specification of Letters Patent.  Patented Jan. 4, 1910.

Application filed April 19, 1909. Serial No. 490,851.

*To all whom it may concern:*

Be it known that I, THEODORE P. ALLEN, a citizen of the United States, residing at Humphreys, in the county of Sullivan, State of Missouri, have invented certain new and useful Improvements in Receipt-Files; and I do hereby declare the following to be a full, clear, and exact description of the invention, such as will enable others skilled in the art to which it appertains to make and use the same.

This invention relates to improvements in files, and more particularly to the type employing a spear upon which the papers are run.

One object of the invention is the provision of a cabinet or casing provided interiorly with a plurality of spears, which can be readily detached from the casing whenever desired, in order that the papers thereon may be run on to a string, for future use and keeping.

With these and other objects in view as will more fully hereinafter appear, the present invention consists in certain novel details of construction and arrangement of parts, hereinafter fully described, illustrated in the accompanying drawings and more particularly pointed out in the appended claims, it being understood that various changes in the form, proportion, size and minor details of the device may be made without departing from the spirit or sacrificing any of the advantages of the invention.

Figure 1:
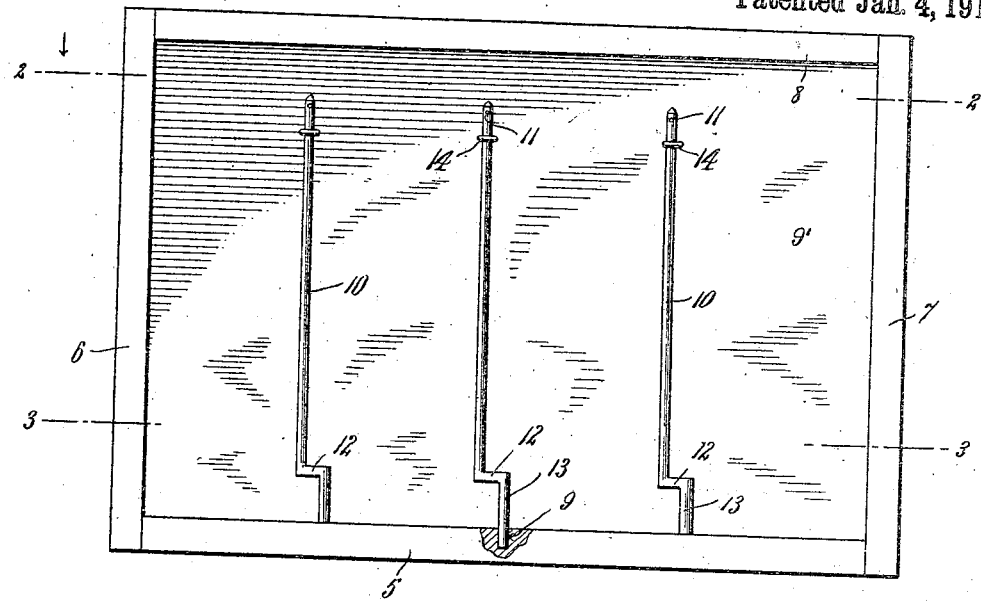
Figure 2:
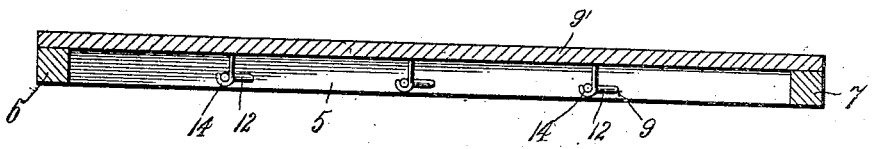
Figure 3:
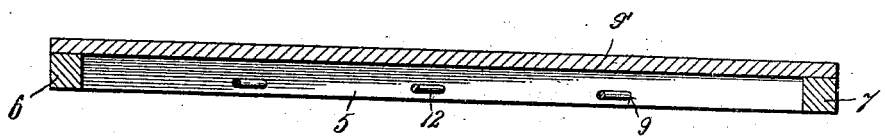
Figure 4:
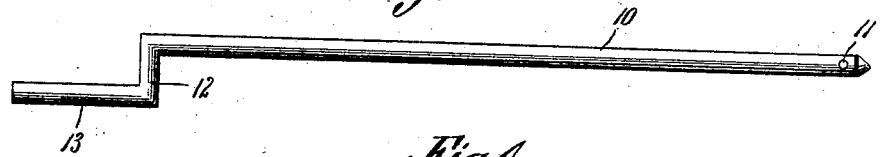

In the accompanying drawings forming part of the specification:—Figure 1 is a side elevation of the device. Fig. 2 is a sectional plan view on the line 2—2, of Fig. 1. Fig. 3 is a similar view on the line 3—3 of Fig. 1. Fig. 4 is a detailed side elevation of one of the spears.

Similar numerals of reference are employed to designate corresponding parts throughout.

As shown in the drawings a suitable casing is provided, having a bottom 5, from the opposite ends of which rise the end walls 6 and 7, the upper ends of which are connected by the top 8. Rising from one side of the bottom 5, is a side wall 9', the opposite ends and upper sides of which are secured to the end walls 6 and 7 and top 8. The opposite side of the casing may be left open, or a suitable door be hinged to the bottom 5, which will be of a size to completely seal the opening presented by the top and bottom and end walls 6 and 7. As shown in the drawings the casing is rectangular in contour and this will be the usual shape; it must be understood, however, that I am not to be limited to this specific form, since from what will appear later it can be understood that various shapes of casings may be employed, according to the character of the bills, to be filed therein.

By referring now to Fig. 1 it will be seen that the bottom 5 of the casing is provided with a series of spaced seats, in which are fitted the lower ends of a plurality of spears. These members are arranged in a vertical plane and are parallel with each other and may be equally spaced apart or the spaces between the spears may be unequal, whereby large and small bills may be filed on the spears without danger of the bills on one spear mixing with those of an adjacent spear. The seats for the lower ends of the spears are designated in general by the numeral 9, and are slightly greater in diameter than the diameters of the spears, so that the latter may be readily turned therein or removed whenever desired. The spears are designated in general by the numeral 10, and are each formed of a single piece of wire, or the like, and of a length to extend to a point adjacent the top 8 of the casing. The upper end of each spear terminates in a sharpened point, and formed directly beneath this sharpened point is a transverse eye or opening 11, the function of which will appear later. Each spear is provided adjacent its lower end with a lateral offset 12, which terminates in a vertically downward extension 13, which enters the seat 9. As before stated, the lower ends are so disposed within the seats that they may be readily turned therein and by providing the offsets 12 the upper or pointed ends of the spears will when turned extend outwardly and beyond the plane of the casing, so that the bills may be filed thereon without the necessity of the operator placing his hand between the cover and upper end of the spear. In order that the spears may be held within the casing a plurality of hooks 14 are provided.

In the use of the device it is designed that the offset portions 12 will be parallel with the length of the bottom 5 and when it is desired to place a bill on the spear, all that will be necessary to do will be to disengage the upper end of the spear from its hook and turn the spear so that its upper end will extend beyond the plane of the casing; in this position the bill may be filed, after which the spear is turned and secured again by the hook. The offset 12 serves the further purpose of preventing the downward movement of the bills on the spears, and after the latter have been filled with bills and it is desired to transfer the said bills to a place of storage or the like, all that will be necessary to do is to disengage the spear from the seat 9 and reeve a thread or wire through the top opening 11; the spear is then inverted and in this position the bills may be readily slipped over the portion 13 on to the thread or wire.

Thus it can be seen that I have provided a device which is comparatively simple in structure and inexpensive to manufacture embodying few parts and these so arranged that the danger of derangement will be reduced to a minimum.

Having thus described my invention what is claimed as new, is:—

1. In a device of the character described, a casing, a plurality of vertically disposed rods having their lower ends removably secured in the bottom of said casing, said rods being provided with lateral offsets so arranged that the upper ends of the rods, will when turned in one direction extend beyond the vertical plane of the casing.

2. In a device of the character described, a casing, a plurality of spaced and vertically disposed rods having their lower ends removably secured in the bottom of said casing, and their upper ends sharpened to a point, said rods being provided with lateral offsets adjacent their lower ends, and hooks threaded into said casing, and having their bills normally embracing the upper ends of said rods.

In testimony whereof, I affix my signature, in presence of two witnesses.

THEODORE P. ALLEN.

Witnesses:
F. REID,
F. D. MOBERLY.